Figure 1:
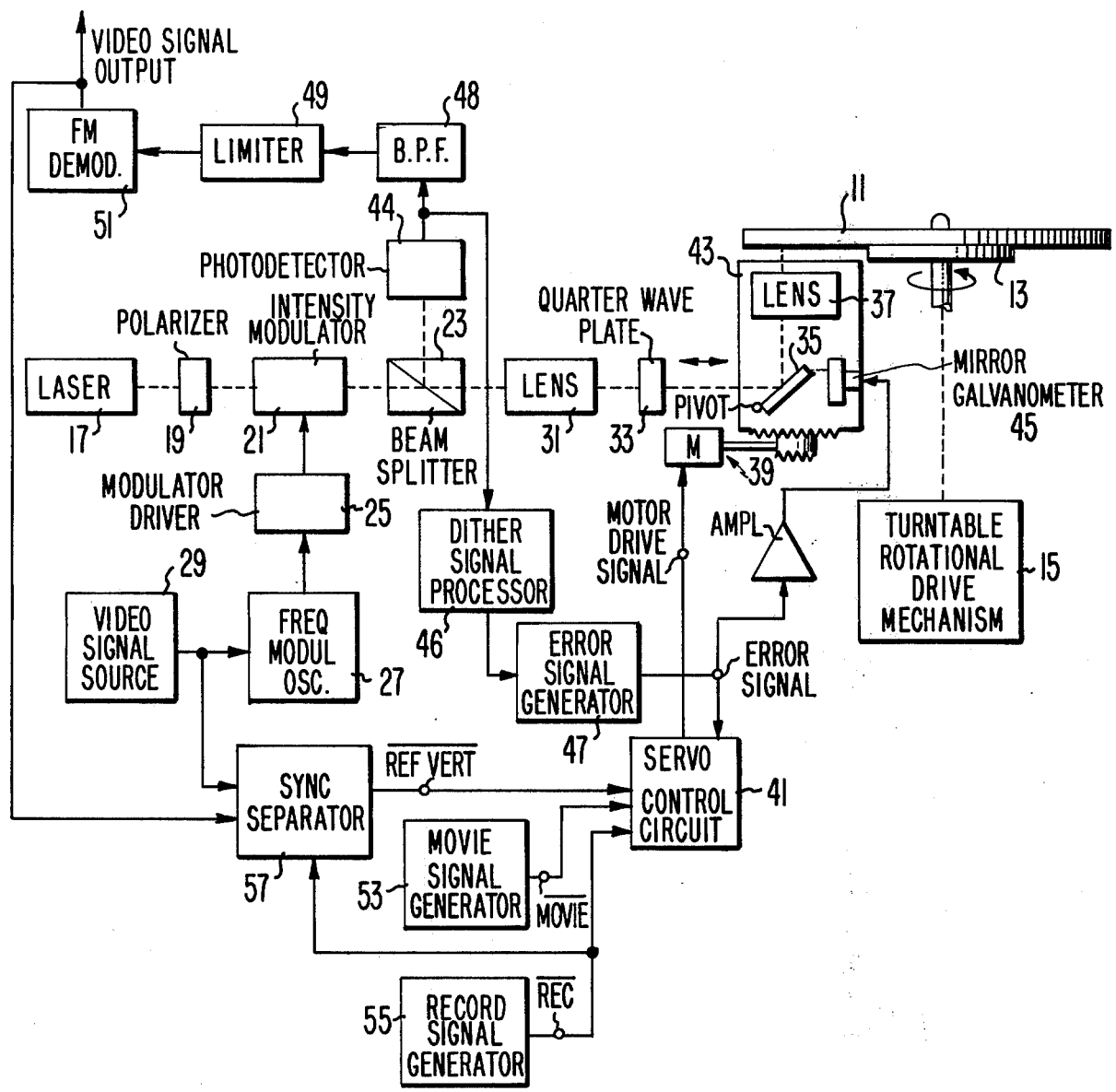

United States Patent [19]

Goldschmidt et al.

[11] 4,160,270
[45] Jul. 3, 1979

[54] TRACKING SERVO SYSTEM FOR VIDEO DISC PLAYER/RECORDER

[75] Inventors: Arthur M. Goldschmidt, Moorestown; Lee V. Hedlund, Cinnaminson, both of N.J.

[73] Assignee: RCA Corporation, New York, N.Y.

[21] Appl. No.: 835,589

[22] Filed: Sep. 22, 1977

[51] Int. Cl.² ............... H04N 5/76; G11B 17/00; G11B 21/10
[52] U.S. Cl. ............... 358/128; 179/100.3 V; 360/77
[58] Field of Search ............... 358/128, 127; 179/100.3 V; 360/77; 250/202; 346/76 L, 108

[56] References Cited

U.S. PATENT DOCUMENTS

| | | | |
|---|---|---|---|
| 3,423,524 | 1/1969 | Bradford | 358/128 |
| 3,530,258 | 9/1970 | Gregg | 358/128 |
| 3,737,877 | 6/1973 | Feinleib | 179/100.3 V |
| 3,854,015 | 12/1974 | Janssen | 179/100.3 V |
| 3,908,076 | 9/1975 | Broadbent | 358/127 |
| 3,931,460 | 1/1976 | Watson | 179/100.3 V |
| 3,944,727 | 3/1976 | Elliott | 179/100.3 V |
| 3,983,317 | 9/1976 | Glorioso | 358/128 |
| 4,065,786 | 12/1977 | Stewart | 358/127 |

Primary Examiner—Bernard Konick
Assistant Examiner—Alan Faber
Attorney, Agent, or Firm—E. M. Whitacre; W. H. Meagher; Jerald E. Roehling

[57] ABSTRACT

A servo loop is provided in an optical record/play apparatus for controlling a motor assembly providing relative motion in a radial direction, with respect to a disc record, between the disc record and a beam of focused light. In a record mode of operation for the apparatus, the loop drives the motor at a rate providing a constant speed radial relative motion, as the disc record is rotated, to enable the inscription of a spiral information track on the disc. In a playback mode of operation for the apparatus, the loop drives the motor at a variable rate providing relative radial motion which assures the centering of the beam of focused light on a spiral information track formed in the disc record medium as the disc is rotated.

7 Claims, 2 Drawing Figures

TRACKING SERVO SYSTEM FOR VIDEO DISC PLAYER/RECORDER

The present invention relates generally to control systems for an optical disc record/play apparatus, and particularly to a novel and improved system for control of relative motion in a radial direction between a high-density information record in disc form and a record/-play beam of focused light. The high-density information record may, for purposes of illustration only, be of the type described in copending U.S. Application Ser. No. 668,495 — Spong, filed Mar. 19, 1976, now U.S. Pat. No. 4,097,895.

In records of the type shown in said Spong application, the light output of a recording beam, which is intensity modulated in accordance with a signal to be recorded, is focused upon the surface of the disc as the disc is rotated. With the peak intensity of the focused light sufficient to cause ablation of an absorptive layer coated over the disc surface, an information track is formed as a succession of pits in the absorptive layer. In playback of such disc records, a light of a constant intensity, insufficient to cause further ablation of the absorptive layer, is focused on the information track. A photodetector, positioned to receive light reflected from the information track which is modulated in intensity by the pits passage through the path of light, develops a signal representative of the recorded information.

Where a continuous sequence of information is to be recorded (a so-called movie), a spiral information track may be formed by providing relative motion, in a radial direction and at a constant rate during the recording between the recording beam and the rotating disc. Reference may be made to U.S. Application Ser. No. 777,478 — Goldschmidt, filed Mar. 14, 1977, now U.S. Pat. No. 4,123,779, for details of a turntable rotational speed and phase control system.

Pursuant to the principles of the present invention, relative motion in a radial direction between a disc record blank and a recording beam of focused light, is provided by a reflecting mirror which is radially translated, with respect to the disc surface, by means of a servo loop controlled motor assembly. The loop drives the motor to cause radial translation of the mirror at a constant rate to enable the inscription of a spiral information track on the rotating disc.

In further pursuance of the principles of the present invention, the servo loop by driving the motor assembly, provides relative motion in a radial direction between a rotating disc record and a playback beam of focused light to enable recovery of the spirally inscribed information. Loop operation, however, is modified to take account of information track irregularities (e.g., non-uniformity in the spacing between adjacent tracks due to disc warpage). In this modification of loop operation, advantage is taken of a fine control arrangement in the player apparatus which maintains the playback beam centered on the information track through use of a mirror galvanometer. Reference may be made to copending U.S. Application Ser. No. 777,474 - Hedlund, filed Mar. 14, 1977, for an explanation of such an arrangement.

In accordance with one aspect of the present invention, the operation of the servo loop in a record mode advantageously utilizes synchronization pulses, accompanying the information to be recorded, as reference pulses to provide the aforementioned constant rate radial relative motion. In a playback mode of operation, the synchronization information, accompanying the information recovered from the disc record, is advantageously utilized as reference pulses in the operation of the servo loop.

Figure 2:
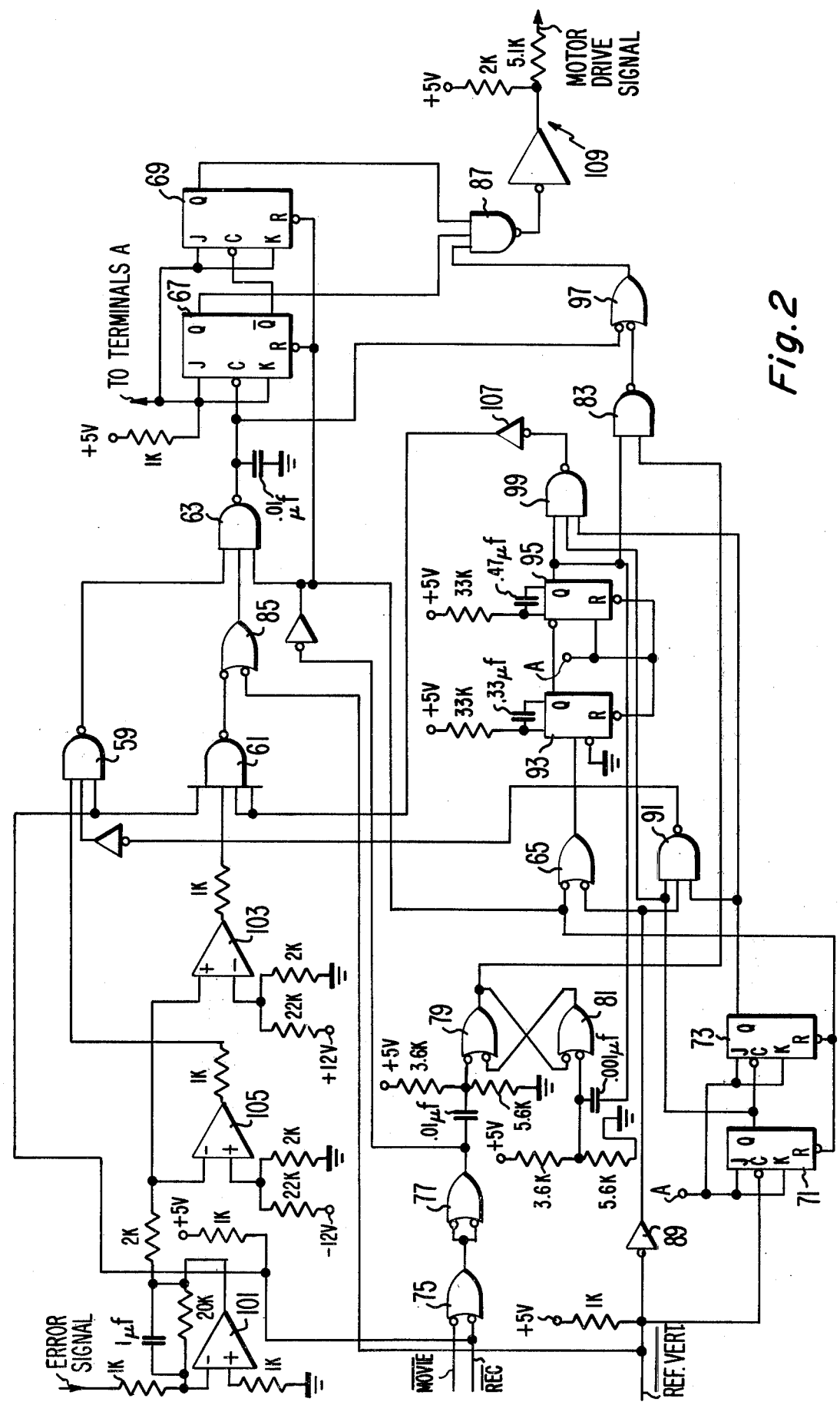

In the accompanying drawings:

FIG. 1 provides a representation, partially in block diagram form, of optical record/play apparatus, in accordance with the principles of the present invention suitable for use with a disc-shaped recording medium; and FIG. 2 provides a circuit diagram for a servo control unit in accordance with the principles of the present invention, provided in the servo loop of the apparatus illustrated in FIG. 1.

For an initial explanation of operation of the apparatus illustrated in FIG. 1, in a record mode it should be assumed that a record blank disc 11, illustratively of the type disclosed in the aforementioned Spong application, is supported on a turntable 13 which is subject to rotation at a constant rotational rate (e.g., approximately 1800 rpm) by a turntable rotational drive mechanism 15, illustratively of the type disclosed in the aforementioned Goldschmidt application.

The monochromatic light output of a laser 17 (illustratively of an argon type providing an output wavelength of 4579 angstrom units) is passed via a polarizer 19 and an intensity modulator 21 to a polarized beam splitter 23. The polarizer 19 effects a polarization of the laser output in a direction that permits passage of the intensity modulated light through the beam splitter 23. The intensity modulator 21 is driven by a modulator driver 25, responsive to a carrier wave source in the form of a frequency modulated oscillator 27. The frequency of the carrier wave output of oscillator 27 is subject to variation in accordance with the amplitude of a modulating signal provided by a source 29 of video signals to be recorded, and consequently, the light intensity of the output of modulator 21 is shifted between high and low levels in consonance with the modulated carrier waves.

A lens 31 forms the light passed by beam splitter 23 into a beam which passes through a quarter-wave plate 33 to a stationary mirror 35 which reflects the beam, through a focusing lens 37, on the absorptive surface layer of the disc 11. An absorptive layer region in the path of the focused light beam when the light beam intensity level is high suffers ablation to form a pit, while an absorptive layer region in the path of the focused light beam when the light beam intensity level is low remains undisturbed. The result is formation of an information track of a general type shown in the aforementioned Spong application. When the frequency of the carrier waves controlling the intensity modulator 21 is high, the spacing between successive pits in the information track is short, while when the carrier wave frequency is low, the pit spacing is long.

A lens translational drive mechanism, comprising a motor assembly 39 (e.g., a serial load encoded DC motor drive positioning system such as the "Unidex 820 special" available from AEROTACH, Inc.) energized by a servo control circuit 41, provides, (e.g., by means of appropriate gearing) a constant speed radial motion of a carriage 43 (incorporating lens 37 and mirror 35), when a spiral track information is desired, or a stepped radial motion when it is desired to form a circular track, or a series thereof.

For an explanation of operation of the apparatus of FIG. 1 in a play mode, it may be assumed that the rotating disc 11, illustratively of the type disclosed in the aforementioned Spong application, includes recorded information in a spiral track.

In the play mode of operation, variation of the intensity of the laser output is discontinued by a suitable disabling of the modulation control system 21-25-27. The constant intensity of the laser output is set at a playback level safely below the level causing ablation of the material of the absorptive layer. The laser beam follows the previously described path (via elements 19, 21, 23, 31, 33, and 35) to lens 37 which focuses the beam on the desired information track of disc 11. Light reflected from the information track is returned via elements 37, 35, 33 and 31 to the beam splitter 23, and as the returned light has made two passes through the quarter-wave plate 33, its polarization has been altered to a direction which results in reflection of the returned light by beam splitter 23 to a photodetector 44.

The mode of operation of the translational drive mechanism is chosen to be appropriate for scanning of the form of information track desired to be played back. This mode of operation is effected by cooperation of two controls: a coarse control comprising the motor assembly 39 which produces a radial motion of the carriage 43, and a fine control (e.g., of a type described in the aforementioned Hedlund application and utilizing signal dither techniques), effected by pivoting mirror 35, which causes the scanning spot imaged by this mirror, on the surface of the disc 11, to be radially displaced to maintain the scanning spot centered on an average centralized position along the information track. The pivotal movement of the mirror 35 is controlled by a mirror galvanometer 45 forming, along with a dither signal processor 46 and an error signal generator 47, part of the fine control. The cooperative relationship between the two types of controls will be subsequently discussed below with reference to a spiral form of an information track.

The intensity of light falling upon the photo-detector 44 alternates between a minimum level and a maximum level as the successive pit and undisturbed surface regions of the information track pass through the path of the focused beam. The minimum intensity level for light reaching the photodetector 44 is obtained when an undisturbed region of the absorptive layer is in the focused beam path, while the maximum intensity level for light reaching the photodetector 44 is obtained when a pit is in the focused beam path.

The output of photodetector 44 comprises carrier waves with zero crossings recurring at frequencies varying in consonance with the pit edge spacing variations passing through the focused beam path. The photodetector output is applied to a bandpass filter 48 which selectively passes signal components falling within the deviation range employed for oscillator 27 and appropriate sidebands thereof. The output of bandpass filter 48 is applied via a limiter 49 (removing spurious amplitude modulation of the frequency modulated carrier waves) to the input of a demodulator 51 which recovers the recorded signal information. For purposes of illustration only, the information to be recorded and played back may be assumed to be video information.

The servo control circuit MOVIE and REC inputs are energized by signals respectively generated by a movie signal generator 53 and record signal generator 55, each of which generators may be, for example, a simple switch coupled to an energization source. Moreover, in a record mode of operation, a reference vertical synchronization (REF VERT) signal, which may be derived from the illustrative composite video signal to be recorded by means of a sync separator stage 57 coupled to source 29, are also supplied to the servo control circuit 41. However, in a play mode of operation, the REF VERT signal may be illustratively derived from the composite video signal recovered from the disc record 11 and developed by demodulator 51.

FIG. 2 illustrates a schematic diagram of the servo control circuit 41 in accordance with an embodiment of the present invention. The operation of the control circuit will be firstly discussed in relation to the operation of the record/play apparatus in a record mode where related successive frames of picture information and accompanying sound information are to be recorded (a so-called movie mode, since, on playback of a record of the successive frames and reproduction of the picture information on an image displaying means, the illustration of motion is created).

With both MOVIE and REC inputs at a low level of energization, during system operation in a movie record mode, NAND gates 59 and 61 are effectively inhibited while NAND gate 63, negated input OR gate 65 and flip-flops 67, 69, 71, 73 are effectively enabled. Moreover, the change in energization level to a low level of either of these two inputs applied through negated input OR gate 75 and inverter 77, causes the triggering of cross-coupled negated input OR gates 79, 81 which, in turn, enable NAND gate 83.

The REF VERT signal is applied to one input gate of a negated input OR gate 85, the other input to gate 85 being at a high energization level by the output of inhibited NAND gate 61, to produce at the output of NAND gate 63 (enabled by the MOVIE input low energization level and the high energization level output of inhibited NAND gate 59) a negative going pulse of the same frequency as the REF VERT pulse.

The output of NAND gate 63 is applied to a counter of four, comprising serially connected flip flops 67, 69, which counter output (i.e., output of flip flop 69) enables a NAND gate 87 at a periodic rate of one-fourth the REF VERT signal rate in phase with the REF VERT signal.

The REF VERT signal is respectively applied, through an inverter 89, to respective input terminals of gate 65 and NAND gate 91. The output of gate 65 (enabled as aforementioned by MOVIE bus low energization level) triggers a one shot multivibrator 93, the trailing edge of whose output triggers another one shot multivibrator 95. The output of one shot 95, a positive pulse whose leading edge is delayed from the REF VERT pulse by the output pulse width of one shot 93, is applied to one input of NAND gate 83, which is enabled by the cross-coupled gates 79, 81 as discussed above.

The output of one shot 95 is differentiated and the trailing edge of the differentiated output pulse is used to reset cross coupled gates 79, 81 to change their output to a low energization level and thus disable gate 83 after the passage of one pulse therethrough.

The output of gate 83 is applied to one input terminal of a negated input OR gate 97 whose other input terminal receives the output of gate 63 (the aforesaid negative going pulse of the same frequency of the REF VERT signal). The output of gate 97, applied to one input of gate 87, is therefore a positive going pulse at the REF VERT signal frequency with one additional pulse "contributed" by gate 83 at record mode start to accelerate carriage movement. The output of flip flop 69 enables gate 87 at a rate equal to one-fourth the frequency of the $\overline{\text{REF VERT}}$ signal while the output of flip flop 67 enables gate 87 at a rate equal to one-half the frequency of the $\overline{\text{REF VERT}}$ signal. Therefore, the output of gate 87 is a negative going pulse at one-fourth the $\overline{\text{REF VERT}}$ signal frequency with an additional pulse at record mode start, and the input to the motor stage 39 is constant in rate and results in a constant translational radial motion of the carriage 43 (in FIG. 1) to define a spiral path across the surface of the rotating disc record 11.

With reference now to the operation of the servo control unit when in operation in a movie playback mode, the $\overline{\text{REC}}$ bus will be at a high energization level while the $\overline{\text{MOVIE}}$ bus will be at a low energization level. Gates 59 and 61 are no longer inhibited by the energization level of the $\overline{\text{REC}}$ bus and the signal processing described with regard to the servo circuit operation remains valid with the addition of further processing as described below.

output of flip flop 73, which flop flop 73 together with flip flop 71 comprise a counter of four operating on the $\overline{\text{REF VERT}}$ signal, is applied to NAD gates 91, 99 to enable these gates at a rate which is one-fourth the frequency of the $\overline{\text{REF VERT}}$ signal. Gate 99 also receives the output of flip flop 71 at half the $\overline{\text{REF VERT}}$ signal frequency. The output of gate 99 is therefore a delayed negative pulse at one-fourth the $\overline{\text{REF VERT}}$ signal rate.

The output of gate 99 is inverted and applied to one input terminal of NAND gate 61, while the output of gate 91 (the result of anding the inverted $\overline{\text{REF VERT}}$ with the output of flip flop 73) at one-fourth the $\overline{\text{REF}}$ $\overline{\text{VERT}}$ rate, is inverted and applied to one input terminal of NAND gate 59.

The output of the error signal generator 47 (in FIG. 1), representing an error signal useful in positioning the focused beam to align the scanning spot along an information track inscribed on a record, is applied to an amplifier 101 in the servo control unit. The output of amplifier 101 is coupled to the positive input of a comparator 103 whose output is in turn coupled to one input of gate 61. The output of amplifier 101 is also coupled to a negative input of a comparator 105 whose output is coupled to gate 59. A zero voltage level into both comparators respectively produces negative levels in their outputs to inhibit NAND gates 59, 61 and the operation of the servo control circuit is thus similar to that in the record mode.

When the input to amplifier 101 is positive, indicative of a leading off track position of the carriage, the output thereof will be negative and 20 times the input level with a maximum of −10 volts. under these conditions, the output of comparator 105 will be positive thus enabling gate 59 while the output of comparator 103 will be negative thus inhibiting gate 61. Gate 59 will therefore allow the passage of negative going pulses at one-fourth the $\overline{\text{REF VERT}}$ signal rate to NAND gate 63 where they combine with positive going $\overline{\text{REF VERT}}$ signal pulses to effect an elimination of every fourth $\overline{\text{REF VERT}}$ signal pulse.

When these pulses are divided by four through the operation of flip flops 67, 69 and gate 87, the output of gate 87 will be a pulse rate which is 25% lower than normal. This output, when applied through network 109, will drive the motor assembly 39 (in FIG. 1) at a slower speed to allow the galvo to center on the information track. When this centering occurs, operation is returned to normal pulse rate and normal speed (i.e., one-fourth the $\overline{\text{REF VERT}}$ signal frequency).

When the input from the galvo driver to amplifier 101 is negative, indicative of a lagging off-track position of the carriage, the output of the amplifier 101 will be positive at a level 20 times the input level with a maximum of +5 volts. Under these conditions, the output of comparator 105 will be negative inhibiting gate 59 while the output of comparator 103 will be positive enabling NAND gate 61. With gate 61 enabled, delayed pulses, at a one-fourth rate, from flip-flop 95 are applied to gate 85, via gate 99, inverter 107 and gate 61 to be combined with $\overline{\text{REF VERT}}$ signal pulses at a normal rate.

When these pulses are divided by four through the operation of flip flops 67, 69 and gate 87, the output of gate 87 will be a pulse rate which is 25% higher than normal. This output, when applied through network 109, will drive the motor assembly 39 (in FIG. 1) at a higher speed to allow the galvo to center on the information track. Again, when the centering occurs, the operation of the circuit will return to the normal pulse rate and normal speed.

What is claimed is:

1. In a disc record recorder/player system selectively operable in either of an information recording mode or an information playback mode, said system comprising: a turntable; means for producing a focused beam of light; and means for detecting the leading, lagging or centered position of a scanning spot imaged by the beam on a record carried by said turntable with respect to an information track of such record during system operation in said playback back mode; an apparatus comprising the combination:

means for establishing radial relative motion between said focused beam and said turntable;

means providing an output pulse train of a given frequency, said pulse train having a given number of pulses in a given time interval, for normally energizing said motion establishing means in a manner providing a first constant rate radial relative motion;

first means for altering the given number of pulses in said given time interval provided in said output pulse train by said energizing means in a manner providing said motion establishing means with radial relative motion at a second rate which is lesser than said first rate, in response to the occurrence of spot leading position detection during system operation in said playback mode;

second means for altering the given number of pulses in said given time interval provided in said output pulse train by said energizing means in a manner providing said motion establishing means with radial relative motion at a third rate which is greater than said first rate, in response to the occurrence of spot lagging position detection during system operation in said playback mode; and means for preventing said first and second altering means from affecting the given number of pulses in said time interval of said output pulse train of said energizing means in response to the occurrence of either (a) spot centered position detection during system operation in said playback mode, or (b) system operation in said recording mode.

2. Apparatus in accordance with claim 1, for use with a source of composite video signals to be recorded, said composite video signals comprising lines of video information accompanied by a synchronization signal; said apparatus further comprising:

third means for altering the output pulse train of said energizing means in a manner providing said motion establishing means with accelerated radial relative motion in response to initiation of system operation in said recording mode; and means for preventing said third altering means from affecting the output pulse train of said energizing means in response to the passage of a time interval following said initiation of recording mode operation; said time interval being short relative to the time interval occupied by one of said lines of video information.

3. Apparatus in accordance with claim 1 for use with a source of composite video signals to be recorded, said composite video signals comprising lines of video information accompanied by a synchronization signal; said apparatus further comprising:

means for deriving from composite video signals, provided by said source during system operation in said recording mode, and recovered from said record during system operation in said playback mode, a signal corresponding to said synchronization signal;

wherein said output pulse train normally provided by said energizing means bears a fixed relationship to the frequency of the output of said deriving means.

4. In a disc record recorder/player system selectively operable in either of an information recording mode or an information playback mode, said system comprising: a turntable; means for producing a focused beam of light; and means for detecting the leading, lagging or centered position of a scanning spot imaged by the beam or a record carried by said turntable with respect to an information track of such record during system operation in said playback mode; an apparatus for use with a source of composite video signals to be recorded, said composite video signals comprising lines of video information accompanied by a synchronization signal; said apparatus comprising the combination:

means for establishing radial relative motion between said focused beam and said turntable;

means providing an output pulse train for normally energizing said motion establishing means in a manner providing a first constant rate radial relative motion;

first means for altering the number of pulses in said output pulse train of said energizing means in a manner providing said motion establishing means with radial relative motion at a second rate which is lesser than said first rate, in response to the occurrence of spot leading position detection during system operation in said playback mode;

second means for altering the number of pulses in said output pulse train of said energizing means in a manner providing said motion establishing means with radial relative motion at a third rate which is greater than said first rate, in response to the occurrence of spot lagging position detection during system operation in said playback mode;

means for preventing said first and second altering means from affecting the output pulse train of said energizing means in response to the occurrence of either (a) spot centered position detection during system operation in said playback mode, or (b) system operation in said recording mode; and means for deriving said composite video signals, provided by said source during system operation in said recording mode, and recovered from said record during system operation in said playback mode, a signal corresponding to said synchronization signal;

wherein said output pulse train normally provided by said energizing means bears a fixed relationship to the frequency of the output of said deriving means;

wherein said first altering means includes first means for generating a signal bearing a fixed fractional relationship to the frequency of the output pulse train of said deriving means; and means for subtractively combining said first generating means signal with the output pulse train of said providing means; and wherein said second altering means includes second means for generating a signal bearing a fixed fractional relationship to the frequency of the output pulse train of said deriving means; and means for additively combining said second generating means signal with the output pulse train of said providing means.

5. In a disc record recorder/player system, selectively operable in either of an information recording mode or an information playback mode, for use with a source of composite video signals to be recorded, said composite video signals comprising lines of video information accompanied by a synchronization signal; said player comprising: a turntable; means for producing a focused beam of light; and means for detecting the leading, lagging or centered position of a scanning spot imaged by the beam on a record carried by said turntable with respect to an information track of such record; an apparatus comprising:

means for deriving from composite video signals, provided by said source during system operation in said recording mode, and recovered from said record during system operation in said playback mode, a pulse train signal corresponding to said synchronization signal;

means for inverting said deriving means pulse train signal;

counter means responsive to said pulse train signal for generating a second pulse signal having a frequency bearing a fixed fractional relationship to the frequency of said pulse train signal;

means for delaying said second pulse signal;

first gating circuit means for (1) combining said second pulse signal with the inverted pulse train signal in response to spot leading position detection for providing a leading pulse train having fewer pulses than said inverted pulse train signal; and for (2) combining the delayed second pulse signal with said pulse train signal in response to spot lagging position detection for providing a lagging pulse train signal having more pulses than said pulse train signal;

second counter means for providing an output bearing a fixed relationship to the output of said first gating circuit means;

second gating circuit means for combining the output of said second counter means with the output of said deriving means; and means for energizing a motor assembly providing relative radial motion between said beam and said turntable in accordance with the output of said second gating circuit means.

6. Apparatus in accordance with claim 5, wherein said second gating circuit means includes selectively enabled means for additionally combining the output of said delaying means with the respective outputs of said second counter means and said deriving means; and means for enabling said additionally combining means in response to selection of system operation in a recording mode; and
> means for disabling said additionally combining means in response to the passage of a time interval following said recording mode selection; said time interval being short relative to the time interval occupied by one of said lines of video information.

7. Apparatus in accordance with claim 5, wherein said second gating circuit means includes selectively enabled means for additionally combining the output of said delaying means with the respective outputs of said second counter means and said deriving means; and means for enabling said additionally combining means in response to system operation initiation; and
> means for disabling said additionally combining means in response to the passage of a time interval following said record mode selection; said time interval being short relative to the time interval occupied by one of said lines of video information.

* * * * *

UNITED STATES PATENT AND TRADEMARK OFFICE
CERTIFICATE OF CORRECTION

PATENT NO. : 4,160,270

DATED : July 3, 1979

INVENTOR(S) : Goldschmidt et al.

It is certified that error appears in the above-identified patent and that said Letters Patent is hereby corrected as shown below:

Column 5, line 25, "NAD" should read --NAND--;

" 5, line 55, "under" should read --Under--.

Column 7, line 36, (Claim 4)   "or" should read --on--

" 7, line 63, "prevending" should read --preventing--.

Signed and Sealed this

Sixth Day of November 1979

[SEAL]

Attest:

RUTH C. MASON
*Attesting Officer*

LUTRELLE F. PARKER
*Acting Commissioner of Patents and Trademarks*